United States Patent
Koenig et al.

(10) Patent No.: US 8,529,358 B2
(45) Date of Patent: Sep. 10, 2013

(54) ROTATIONAL COUPLING AND DRIVING ASSEMBLY

(75) Inventors: Nikolaus Koenig, Althegnenberg (DE); Gerd Eisleitner, Augsburg (DE); Mark Brandl, Burgkirchen (DE); Marian Kynast, Muehldorf am Inn (DE); Wolfgang Spaan, Kraiburg am Inn (DE); Markus Till, Ampfing (DE)

(73) Assignee: SGF Sueddeutsche Gelenkscheibenfabrik GmbH & Co. KG (DE)

( * ) Notice: Subject to any disclaimer, the term of this patent is extended or adjusted under 35 U.S.C. 154(b) by 0 days.

(21) Appl. No.: 13/161,704

(22) Filed: Jun. 16, 2011

(65) Prior Publication Data

US 2012/0220381 A1    Aug. 30, 2012

(30) Foreign Application Priority Data

Jun. 16, 2010 (DE) .......................... 10 2010 030 178

(51) Int. Cl.
*F16D 3/66* (2006.01)
(52) U.S. Cl.
USPC ................................ 464/72; 464/81; 464/84
(58) Field of Classification Search
USPC ................ 464/69, 81, 84, 85, 92–96, 71, 72
See application file for complete search history.

(56) References Cited

U.S. PATENT DOCUMENTS 4,804,352 A * 2/1989 Schmidt ..................... 464/81 X

FOREIGN PATENT DOCUMENTS

| DE | 366938 | * | 1/1923 |
| DE | 1 040 854 | | 10/1958 |
| DE | 195 15 101 | | 7/1996 |
| EP | 0 167 654 | | 1/1986 |

* cited by examiner

*Primary Examiner* — Gregory Binda
(74) *Attorney, Agent, or Firm* — Carter DeLuca Farrell & Schmidt LLP (57) ABSTRACT

Rotational coupling is provided having: a first carrier body with a first base section and a plurality of first coupling arms extending from the first base section spaced in a circumferential direction, each having a first coupling section jointly defining a first plane running concentrically and perpendicularly to a rotational axis, a second carrier body including a second base section and a plurality of second coupling arms extending from the second base section spaced in the circumferential direction, each having a second coupling section jointly defining a second plane running concentrically and perpendicularly to the rotational axis, first and second carrier bodies arranged such that the planes coincide, the coupling arms facing one another, alternately interengaging and circumferentially spaced, base sections oriented oppositely along the rotational axis, and each of the coupling sections coupled via elastic link elements to the coupling sections respectively adjacent on both sides.

10 Claims, 8 Drawing Sheets

ROTATIONAL COUPLING AND DRIVING ASSEMBLY

TECHNICAL FIELD

The invention relates to a rotational coupling provided with link elements and to a drive arrangement equipped with such a rotational coupling.

BACKGROUND OF RELATED ART

Rotational couplings provided with link elements are known, for example, from EP 0 167 654 A1, DE 195 15 101 C1 and DE 1 040 854 B.

SUMMARY

The object on which the invention is based is to provide a rotational coupling provided with link elements, in which reliable protection of the rotational coupling against slipping is ensured even on failure of all the link elements. The object on which the invention is further based is to provide a drive arrangement equipped with such a rotational coupling for a large internal combustion engine.

The above-mentioned objects are achieved by a rotational coupling according to the present disclosure.

According to a first aspect of the invention, a rotational coupling has: a first carrier body which has a first base section to be connected to a rotationally driving element, and a plurality of first coupling arms which are arranged in a manner extending from the first base section with circumferential spacing from one another in a circumferential direction of the rotational coupling, the first coupling arms each having a first coupling section, and the first coupling sections jointly defining a first plane running concentrically and perpendicularly with respect to a rotational axis of the rotational coupling, a second carrier body which has a second base section to be connected to an element to be rotationally driven, and a plurality of second coupling arms which are arranged in a manner extending from the second base section with circumferential spacing from one another in the circumferential direction, the second coupling arms each having a second coupling section, and the second coupling sections jointly defining a second plane running concentrically and perpendicularly with respect to the rotational axis, first and second carrier body being arranged in such a way that the first and the second plane coincide, the first and the second coupling arms being arranged in a manner facing one another, alternately interengaging and with circumferential spacing from one another, and that first and second base section are oriented oppositely along the rotational axis, and each of the first and the second coupling sections being coupled via respective elastic link elements to the coupling sections respectively adjacent on both sides.

Preferably, the link elements are provided in relation to the rotational axis axially on both sides, symmetrically on the coupling sections. That is to say, each coupling section is connected via two parallel link elements to the respectively circumferentially adjacent coupling section.

Owing to the toothed wheel-like interengagement, according to the invention, of the first and the second coupling arms, reliable protection of the rotational coupling against slipping is ensured even on failure of all the link elements. Also, failure of individual link elements has only a minor effect on the overall functioning of the rotational coupling.

Owing to the modular design of the rotational coupling according to the invention, this coupling is simple and inexpensive and can be adapted with respect to the transmittable torques simply by varying the number of identical link elements.

In the case of the solution for a rotational coupling according to the invention, identical wearing parts can thus be employed over a wide range of different performance types/sizes.

Owing to the design of the rotational coupling according to the invention, both at the rotationally driving element and at the element to be rotationally driven (e.g. both shaft ends), low restoring forces occur in the event of axial, lateral and angular deviations. Furthermore, the rotational coupling according to the invention has a force-displacement and damping behaviour which is "adjustable" or adaptable over a wide range.

Owing to the open design of the rotational coupling according to the invention, this coupling can be checked with regard to its operational safety in a simple manner (e.g. by visual or optical inspection) and worn individual parts (e.g. the tension links) or else the entire rotational coupling can be quickly and simply replaced using standard tools and without dismantling the coupling. No additional devices or hoists are required for mounting or demounting the rotational coupling.

According to one embodiment of the rotational coupling according to the invention, the first coupling arms each have a U-shaped cross-section, one limb of each first coupling arm being connected to the first base section, and the other limb, connected to the one limb via a web, of each first coupling arm forming its first coupling section.

With this configuration of the invention, an additional load distribution can be provided by flexurally elastic behaviour of the first coupling arms. Furthermore, the first coupling arms configured in this way provide low dissipated heat generation owing to a large surface area and small volume, resulting in considerably improved heat removal, which in turn leads to very low thermal loading of the elastic link elements and thus to a long service life and coupling availability.

According to a further embodiment of the rotational coupling according to the invention, the second coupling arms each have a slightly stretched Z-shaped cross-section, one limb of each second coupling arm being connected to the second base section, and the other limb, connected to the one limb via a web, of each second coupling arm forming its second coupling section.

With this configuration of the invention too, an additional load distribution can be provided by flexurally elastic behaviour of the second coupling arms. Furthermore, the second coupling arms configured in this way provide low dissipated heat generation owing to a large surface area and small volume, resulting in considerably improved heat removal, which in turn leads to very low thermal loading of the elastic link elements and thus to a long service life and coupling availability.

According to yet a further embodiment of the rotational coupling according to the invention, the first base section is formed as a ring, the first coupling arms extending from an inner circumference of the first base section, arranged axially outside the first plane in relation to the rotational axis, radially inwards in the direction towards the rotational axis.

Owing to the ring-shaped configuration of the first base section, the overall weight of the rotational coupling is considerably reduced. Owing to the radially inward extension of the first coupling arms, the radial dimensions of the rotational coupling according to the invention are considerably reduced.

According to a further embodiment of the rotational coupling according to the invention, the second base section is formed as a ring, the second coupling arms extending from an outer circumference of the second base section, arranged axially outside the second plane in relation to the rotational axis, radially outwards in the direction away from the rotational axis.

Owing to the ring-shaped configuration of the second base section too, the overall weight of the rotational coupling is considerably reduced. Owing to the radially outward extension of the second coupling arms, these arms can cooperate space-savingly and optimally with the first coupling arms.

The solution according to the invention affords simple mounting by lateral insertion between, for example, connecting flanges of the rotationally driving and rotationally driven element. Furthermore, the rotational coupling according to the invention can be provided and mounted as a completely preassembled mounting unit (centred system).

According to a further embodiment of the rotational coupling according to the invention, the first and the second base section are each formed as a ring plate. This saves additionally moving mass and material costs.

According to yet a further embodiment of the rotational coupling according to the invention, the first coupling arms are integrally formed on the first base section, the second coupling arms being integrally formed on the second base section.

Preferably, the first and second carrier body are produced from hot- or cold-formed flat material or sheet metal, the coupling arms being configured in such a way that in the aligned state they run at the same axial and radial position, i.e. with coinciding first and second planes.

According to a further embodiment of the rotational coupling according to the invention, the link elements are each formed by an elastomer interspersed with high-strength thread inserts. Extremely transversely elastic link elements are thus provided, the force transmission taking place through the thread inserts and the elastomer serving substantially as a damper and carrier system.

According to yet a further embodiment of the rotational coupling according to the invention, at opposite ends of each link element, respectively one tubular sleeve is let into the elastomer, each of the first and the second coupling sections having two coupling openings, into each coupling opening there being inserted a connecting bolt which extends through the tubular sleeve at one end of an associated link element, so that the link element is coupled to the respective coupling section, and the other end of the respective link element being coupled, via a connecting bolt extending through the tubular sleeve of said link element and through the coupling opening of a circumferentially adjacent coupling section, to the adjacent coupling section.

According to a second aspect of the invention, a drive arrangement has: a large internal combustion engine having a crankshaft, on which a rotationally driving element is provided, a consumer unit which is provided with an element to be rotationally driven, and a rotational coupling unit according to one, more than one or all of the above-described embodiments of the invention in any conceivable combination, the first base section of the first carrier element being drive-connected to the rotationally driving element of the large internal combustion engine, and the second base section of the second carrier element being drive-connected to the element, to be rotationally driven, of the consumer unit.

According to one embodiment of the drive arrangement according to the invention, the rotationally driving element is formed as a flywheel.

According to a further embodiment of the drive arrangement according to the invention, the element to be rotationally driven is formed as a coupling flange, for example of an electrical generator, a compressor or else a pulsation member.

According to yet a further embodiment of the drive arrangement according to the invention, the large internal combustion engine is formed as a large diesel engine and/or large gas engine for a power station, a compressor plant or a ship's propulsion.

Other similar forms of industrial large internal combustion engines are also to be considered as being included in the scope of the invention.

BRIEF DESCRIPTION OF THE DRAWINGS

The invention is described in more detail below using a preferred embodiment and with reference to the appended figures.

DETAILED DESCRIPTION

Figure 2:
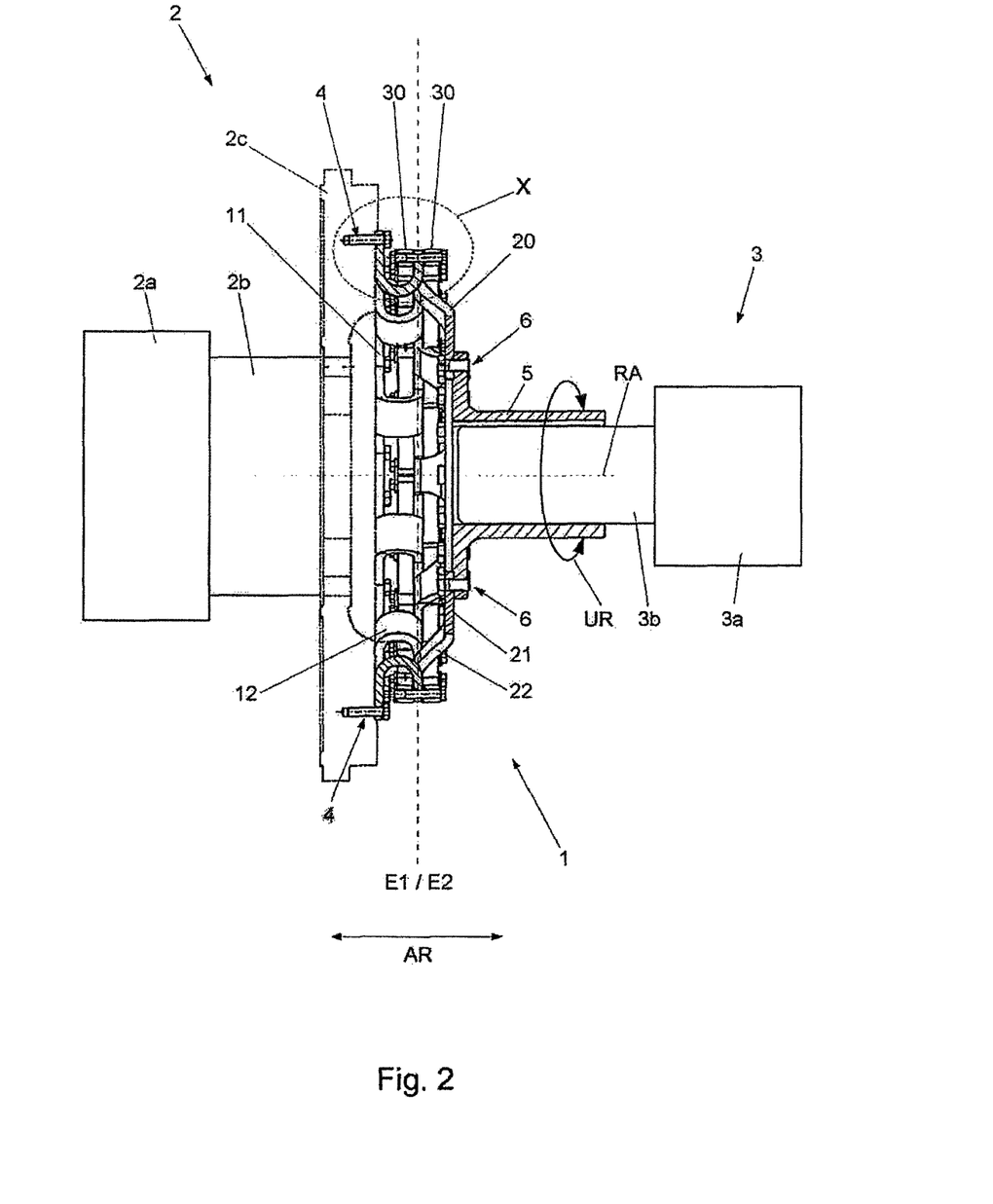
FIG. 2 shows a schematic lateral view of a drive arrangement, equipped with a rotational coupling according to FIG. 1, according to an embodiment of the invention.

As FIG. 2 shows, a drive arrangement according to an embodiment of the invention has a large internal combustion engine 2 in the form of a large diesel engine, a consumer unit 3 in the form of an electrical generator and a rotational coupling 1, via which the large internal combustion engine 2 and the consumer unit 3 are coupled in a rotationally driving manner.

The large internal combustion engine 2 has an engine block 2a, a crankshaft 2b and a flywheel as a rotationally driving element 2c of the large internal combustion engine 2.

The rotationally driving element 2c of the large internal combustion engine 2 is coupled in a rotationally driving manner to a first carrier body 10 of the rotational coupling 1 via screw connections 4.

The consumer unit 3 has a generator body 3a, in which a stator and a rotor (not shown) of the consumer unit 3 are arranged, and a drive shaft 3b which is connected to the rotor and is coupled in a rotationally driving manner via shaft toothing to an element 5, to be rotationally driven, in the form of an internally toothed coupling flange body. The element 5 to be rotationally driven is coupled in a rotationally driving manner to a second carrier body 20 of the rotational coupling 1 via screw connections 6.

With additional reference to FIGS. 1, 3, 4, 5, 7 and 8, the first carrier body 10 of the rotational coupling 1 has a base section 11 which is connected to the rotationally driving element 2c of the large internal combustion engine 2 via the screw connections 4, and a plurality of first coupling arms 12 which are arranged in a manner extending from the first base section 11 with circumferential spacing from one another in a circumferential direction UR of the rotational coupling 1.

Figure 1:
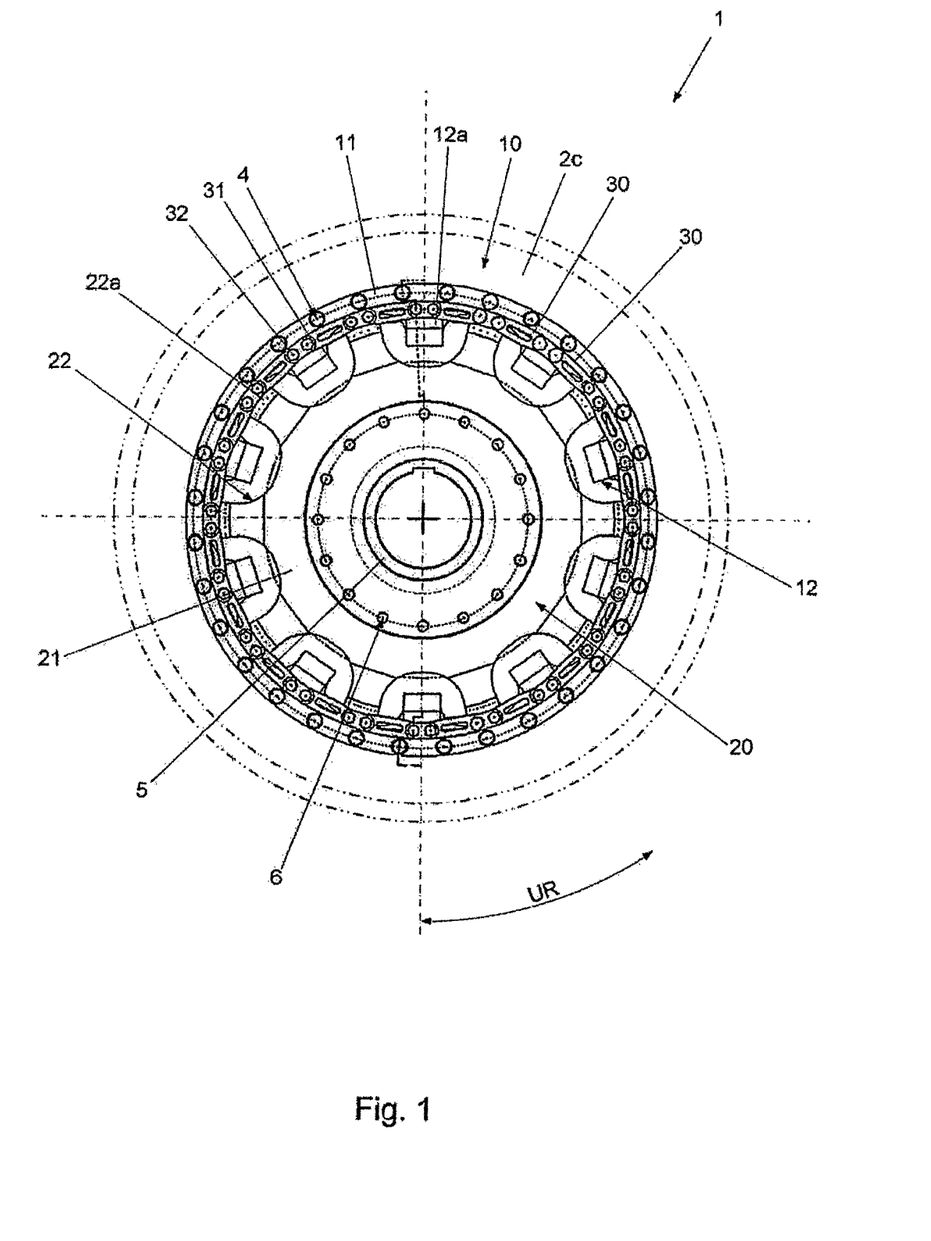
FIG. 1 shows a plan view of a rotational coupling according to an embodiment of the invention, seen in the axial direction.
Figure 4:
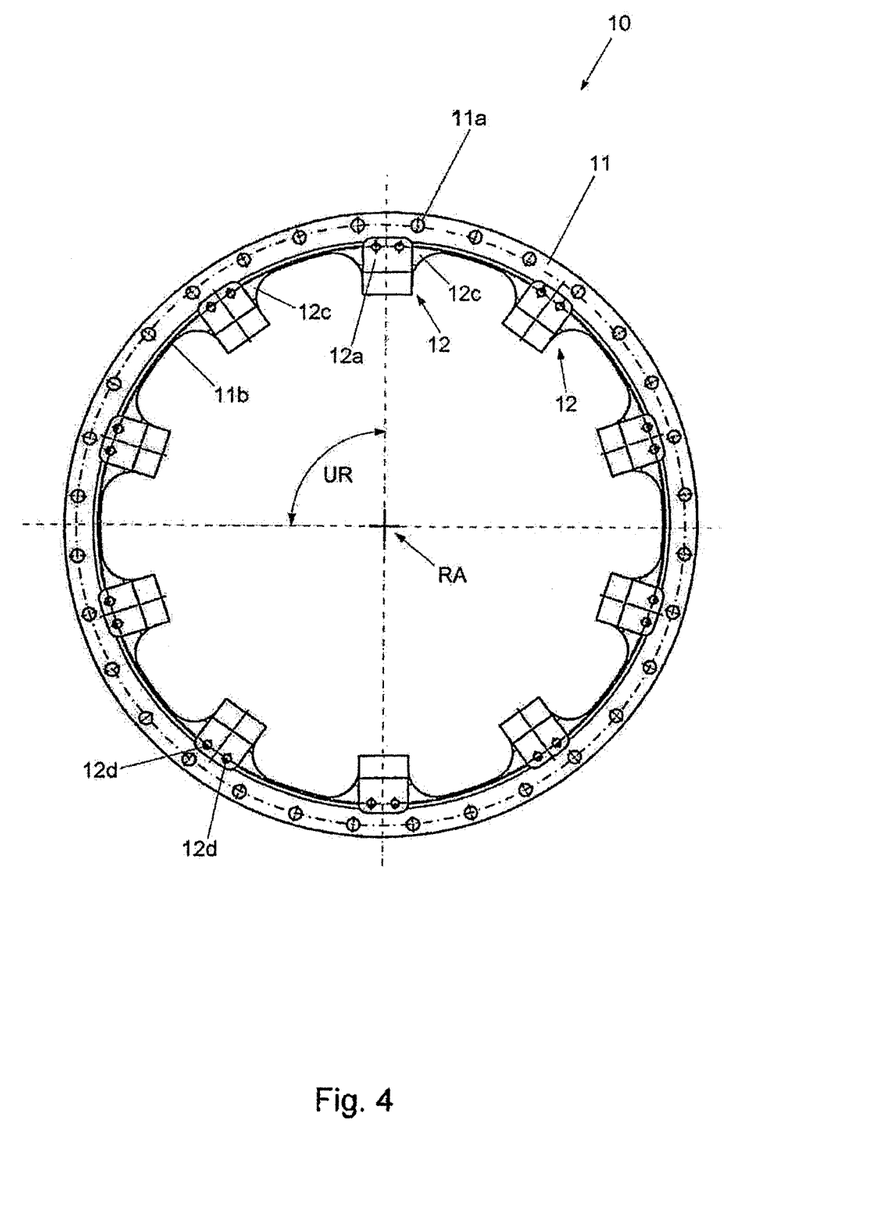
FIG. 4 shows a plan view of a first carrier body of the rotational coupling of FIG. 1 and FIG. 2, seen in the axial direction.
Figure 5:
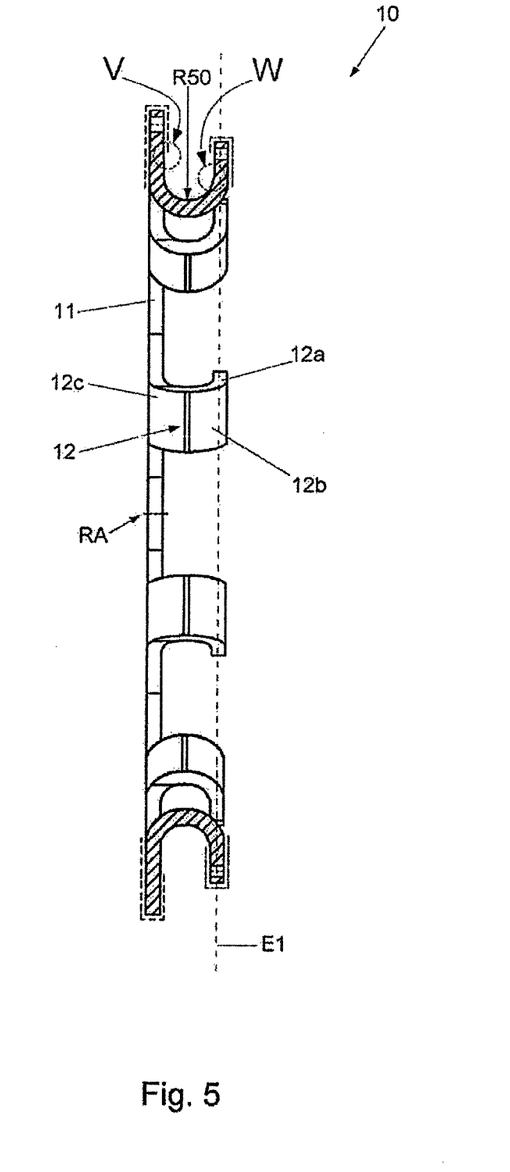
FIG. 5 shows a lateral view of the first carrier body of FIG. 4.

The first coupling arms 12 each have a first coupling section 12a, the first coupling sections 12a jointly defining a first plane E1 running concentrically and perpendicularly with respect to a rotational axis RA of the rotational coupling 1.

The first base section 11 has a plurality of circumferentially uniformly distributed bores 11a, via which the first base section 11 is connected to the rotationally driving element 2c, having threaded bores (not denoted), of the large internal combustion engine 2 to produce the screw connections 4 by means of screws (not separately denoted) which are passed through.

The first base section 11 is formed as a ring plate, the first coupling arms 12 extending from an inner circumference 11b of the first base section 11, arranged axially outside the first plane E1 in relation to the rotational axis RA, radially inwards in the direction towards the rotational axis RA.

The first coupling arms 12 each have a U-shaped cross-section, the web 12b (see FIG. 3) of which may have, for example, a radius R=50 mm, one limb 12c of each first coupling arm 12 being connected in one piece to the first base section 11 or integrally formed thereon, and the other limb of each first coupling arm 12 forming its first coupling section 12a.

Figure 7:
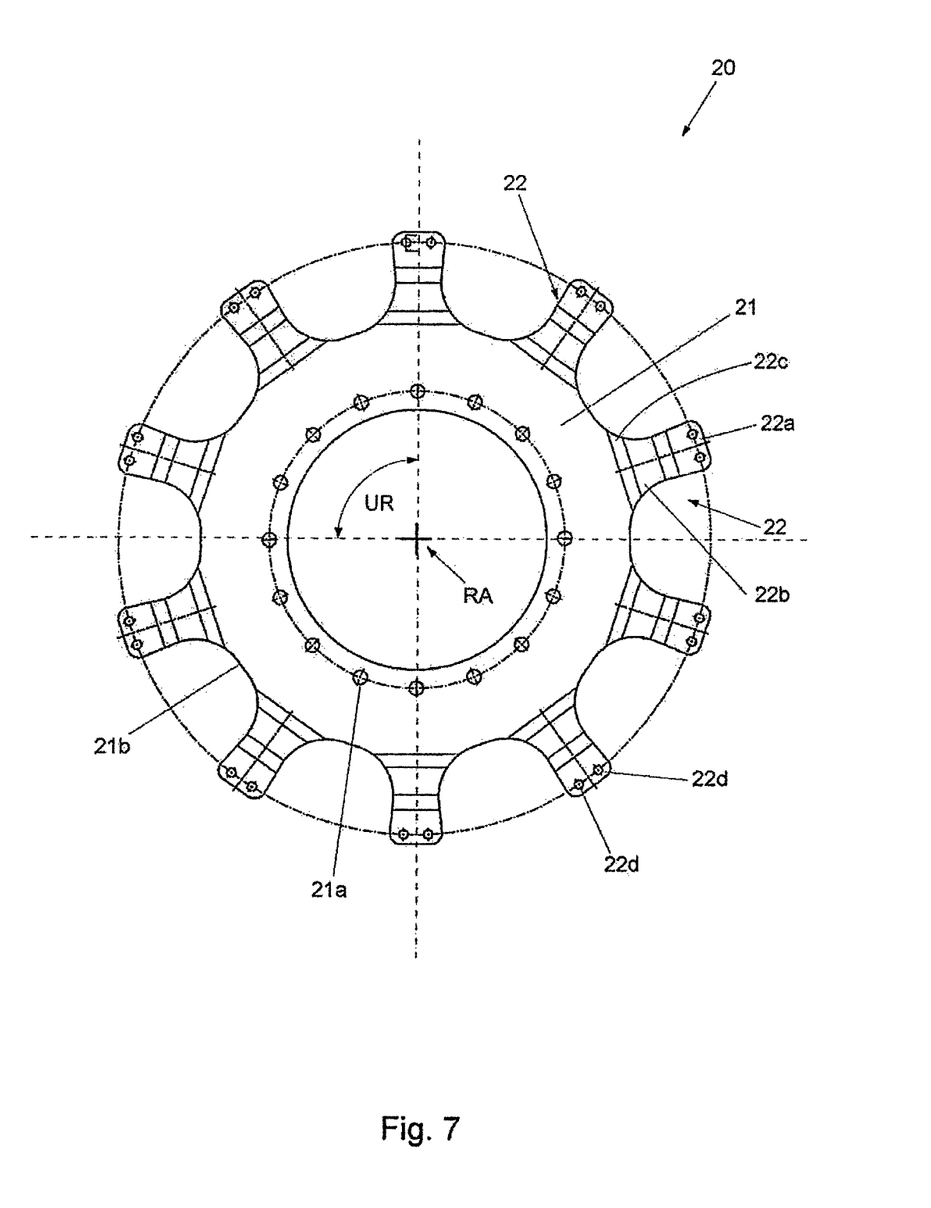
FIG. 7 shows a plan view of a second carrier body of the rotational coupling of FIG. 1 and FIG. 2, seen in the axial direction.
Figure 8:
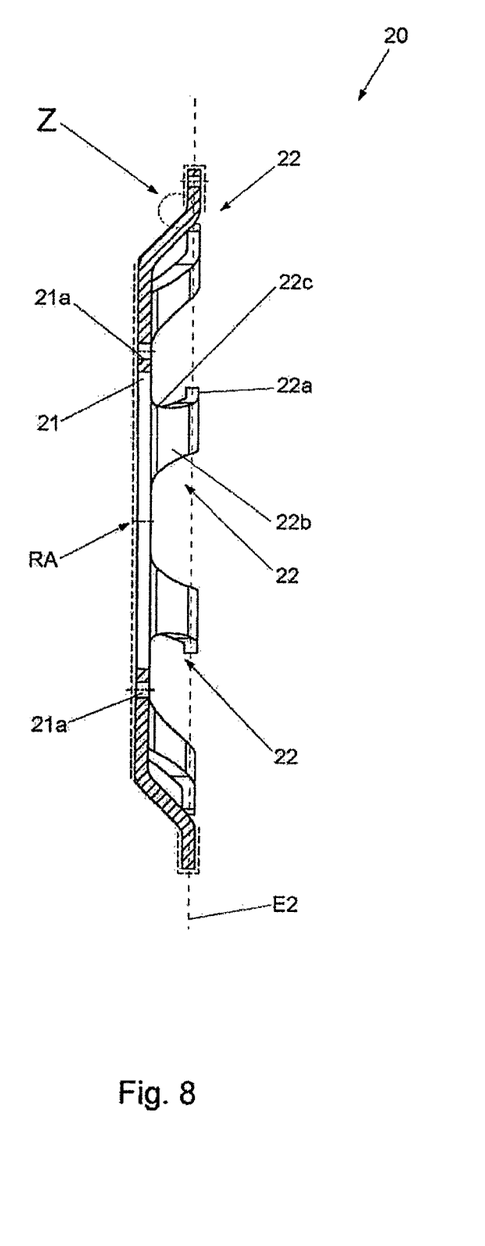
FIG. 8 shows a lateral view of the second carrier body of FIG. 7.

The second carrier body 20 has a second base section 21 which is connected to the element 5 to be rotationally driven via the screw connections 6, and a plurality of second coupling arms 22 which are arranged in a manner extending from the second base section 21 with circumferential spacing from one another in the circumferential direction UR.

The second coupling arms 22 each have a second coupling section 22a, the second coupling sections 22a jointly defining a second plane E2 running concentrically and perpendicularly with respect to the rotational axis RA.

The second base section 21 has a plurality of circumferentially uniformly distributed threaded bores 21a, via which the second base section 21 is connected to the element 5 to be rotationally driven, having bores (not denoted), of the consumer unit 3 to produce the screw connections 6 by means of screws (not separately denoted) which are passed through or screwed in.

The second base section 21 is formed as a ring plate, the second coupling arms 22 extending from an outer circumference 21b of the second base section 21, arranged axially outside the second plane E2 in relation to the rotational axis RA, radially outwards in the direction away from the rotational axis RA.

The second coupling arms 22 each have a slightly stretched Z-shaped cross-section (which can best be seen in FIG. 8 at the very top), one limb 22c of each second coupling arm 22 being connected in one piece to the second base section 21 or integrally formed thereon, and the other limb, connected via a web 22b, of each second coupling arm 22 forming its second coupling section 22a.

Preferably, the first carrier body 10 and the second carrier body 20 are produced from hot- or cold-formed flat material or sheet metal, from which the respective first and second coupling arms 12, 22 are shaped, for example by bending and pressing.

As can be seen from FIG. 2, the first carrier body 10 and the second carrier body 20 are arranged in such a way that the first plane E1 and the second plane E2 coincide (i.e. in an axial direction AR of the rotational coupling 1 are arranged at the same position), the first coupling arms 12 and the second coupling arms 22 being arranged in a manner facing one another, alternately interengaging finger-like or toothing-like and with circumferential spacing from one another.

The first carrier body 10 and the second carrier body 20 are further arranged in such a way that the first base section 11 and the second base section 21 are oriented oppositely along the rotational axis RA.

Figure 3:
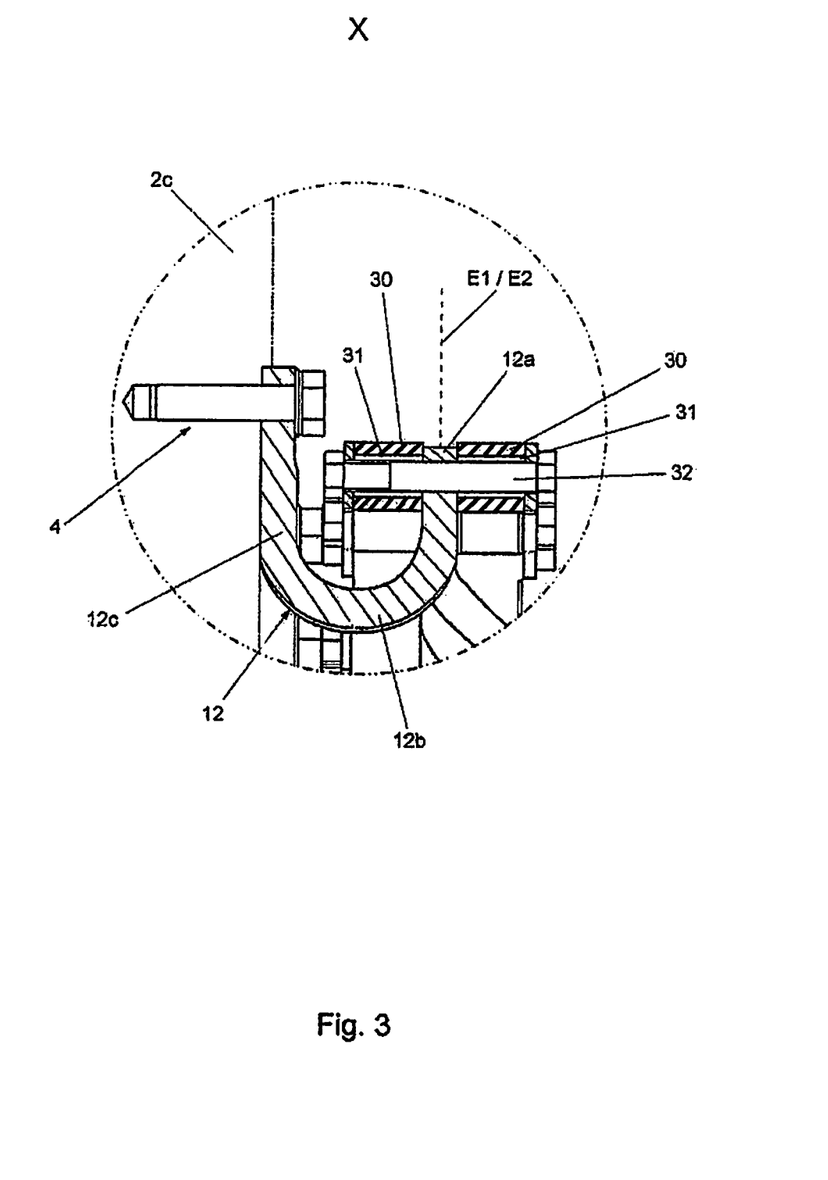
FIG. 3 shows an enlarged view of a region X in FIG. 2.

As can further be seen from FIGS. 1 to 3, each of the first coupling sections 12a and the second coupling sections 22a is coupled via respective elastic link elements 30 to the coupling sections 22a and 12a respectively adjacent on both sides.

In other words, the link elements 30, as can be seen in particular from FIG. 2 and FIG. 3, are provided in relation to the rotational axis RA axially on both sides, symmetrically on the first coupling sections 12a and on the second coupling sections 22a. That is to say, each coupling section 12a, 22a is connected via two mutually parallel link elements 30, 30 to the respectively circumferentially adjacent coupling section 22a and 12a.

The link elements 30 are each formed by an elastomer interspersed with highstrength thread inserts. At opposite ends of each link element 30, respectively one tubular sleeve 31 is let into the elastomer of the respective link element 30.

Each of the first coupling sections 12a has two coupling openings 12d, circumferentially spaced apart from one another in the circumferential direction UR, in the form of through-bores. In the same way, each of the second coupling sections 22a has two coupling openings 22d, circumferentially spaced apart from one another in the circumferential direction UR.

Into each coupling opening 12d and 22d there is inserted a connecting bolt 32 in the form of a screw bolt which is provided with a screw nut (not denoted separately) and extends through the tubular sleeve 31 at one end of an associated link element 30, so that the link element 30 is coupled to the respective coupling section 12a and 22a, the other end of the respective link element 30 being coupled, via a connecting bolt 32 extending through the tubular sleeve 31 of said link element and through the coupling opening 22d and 12d of a circumferentially adjacent coupling section 22a and 12a, to the adjacent coupling section 22a and 12a.

Figure 6:
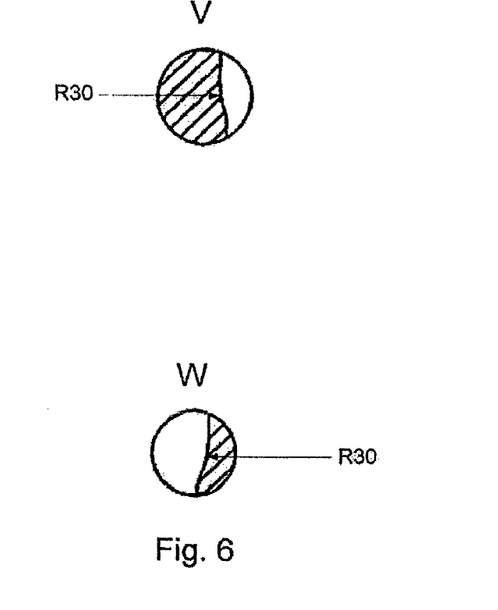
FIG. 6 shows enlarged views of regions V and W in FIG. 5.
Figure 9:
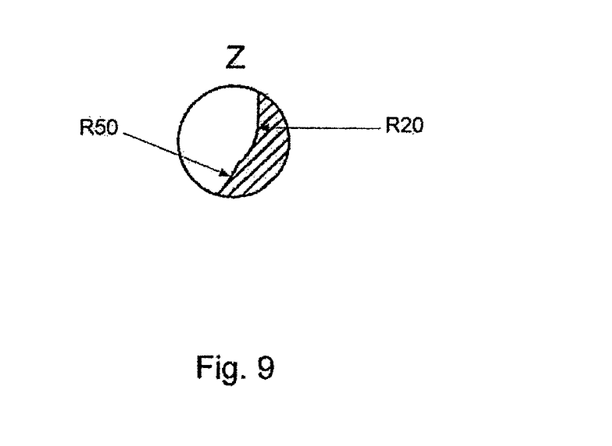
FIG. 9 shows an enlarged view of a region Z in FIG. 8.

With reference finally to FIGS. 6 and 9, it can be seen that both the first coupling arms 12 and the second coupling arms 22 are provided with so-called run-out radii, such as, for example, R=20 mm, R=30 mm and R=50 mm, so that sharp edges and thus potential locations of rupture are avoided.

LIST OF REFERENCE SYMBOLS 1 rotational coupling
2 large internal combustion engine
2a engine block
2b crankshaft
2c rotationally driving element
3 consumer unit
3a generator body
3b drive shaft
4 screw connection
5 element to be rotationally driven
6 screw connection
10 first carrier body
11 first base section
11a bore
11b inner circumference
12 first coupling arm
12a first coupling section
12b web
12c limb 12d coupling opening
20 second base section
21a threaded bore
21b outer circumference
22 second coupling arm
22a second coupling section
22b web
22c limb
22d coupling opening
30 link element
31 tubular sleeve
32 connecting bolt
UR circumferential direction
AR axial direction
RA rotational axis
E1 first plane
E2 second plane
R radius

The invention claimed is:

1. A rotational coupling, having:
a first carrier body which has a first base section to be connected to a rotationally driving element, and a plurality of first coupling arms which are arranged in a manner extending from the first base section with circumferential spacing from one another in a circumferential direction of the rotational coupling, the first coupling arms each having a first coupling section, and the first coupling sections jointly defining a first plane running concentrically and perpendicularly with respect to a rotational axis of the rotational coupling,
a second carrier body which has a second base section to be connected to an element to be rotationally driven, and a plurality of second coupling arms which are arranged in a manner extending from the second base section with circumferential spacing from one another in the circumferential direction, the second coupling arms each having a second coupling section, and the second coupling sections jointly defining a second plane running concentrically and perpendicularly with respect to the rotational axis,
first and second carrier bodies being arranged in such a way that the first and the second plane coincide, the first and the second coupling arms being arranged in a manner facing one another, alternately interengaging and with circumferential spacing from one another, and that first and second base section are oriented oppositely along the rotational axis, and
each of the first and the second coupling sections being coupled via respective elastic link elements to the coupling sections respectively adjacent on both sides.

2. The rotational coupling according to claim 1, the first coupling arms each having a U-shaped cross-section, one limb of each first coupling arm being connected to the first base section, and the other limb of each first coupling arm forming its first coupling section.

3. The rotational coupling according to claim 1, the second coupling arms each having a Z-shaped cross-section, one limb of each second coupling arm being connected to the second base section, and the other limb of each second coupling arm forming its second coupling section.

4. The rotational coupling according to claim 1, the first base section being formed as a ring, and the first coupling arms extending from an inner circumference of the first base section, arranged axially outside the first plane in relation to the rotational axis, radially inwards in the direction towards the rotational axis.

5. The rotational coupling according to claim 1, the second base section being formed as a ring, and the second coupling arms extending from an outer circumference of the second base section, arranged axially outside the second plane in relation to the rotational axis, radially outwards in the direction away from the rotational axis.

6. The rotational coupling according to claim 1, the first and the second base section each being formed as a ring plate.

7. The rotational coupling according to claim 6, the first coupling arms being integrally formed on the first base section, and the second coupling arms being integrally formed on the second base section.

8. The rotational coupling according to claim 1, the link elements each being formed by an elastomer interspersed with thread inserts.

9. The rotational coupling according to claim 8, at opposite ends of each link element, respectively one tubular sleeve being let into the elastomer, each of the first and the second coupling sections having two coupling openings, into each coupling opening there being inserted a connecting bolt which extends through the tubular sleeve at one end of an associated link element, so that the link element is coupled to the respective coupling section, and the other end of the respective link element being coupled, via a connecting bolt extending through the tubular sleeve of said link element and through the coupling opening of a circumferentially adjacent coupling section, to the adjacent coupling section.

10. A drive arrangement, having:
a large internal combustion engine having a crankshaft, on which a rotationally driving element is provided,
a consumer unit which is provided with an element to be rotationally driven, and
a rotational coupling unit according to claim 1, the first base section of the first carrier element being drive-connected to the rotationally driving element of the large internal combustion engine, and the second base section of the second carrier element being drive-connected to the element, to be rotationally driven, of the consumer unit.

* * * * *